United States Patent [19]

Gray

[11] 4,216,811
[45] Aug. 12, 1980

[54] TIRE CHAIN LINKS AND FASTENING DEVICE

[76] Inventor: Gorman D. Gray, Rte. 1, P.O. Box 37, Eagle Creek, Oreg. 97022

[21] Appl. No.: 726,236

[22] Filed: Sep. 24, 1976

[51] Int. Cl.² ............................................. B60C 27/06
[52] U.S. Cl. .................................. 152/213 A; 152/231; 152/243
[58] Field of Search ................... 152/213 A, 231–232, 152/239–245; 59/85

[56] References Cited

U.S. PATENT DOCUMENTS

| | | | |
|---|---|---|---|
| 1,059,182 | 4/1913 | Martin | 152/242 |
| 1,598,271 | 8/1926 | Edwards | 152/239 X |
| 1,909,896 | 5/1933 | Reyburn | 152/243 |
| 2,192,226 | 3/1940 | Hill | 152/241 |
| 2,436,715 | 2/1948 | Everline | 152/242 |
| 2,582,493 | 1/1952 | Lloyd | 152/241 |
| 2,622,651 | 12/1952 | Gause | 152/241 X |
| 3,844,324 | 10/1974 | Kondo et al. | 152/241 X |
| 3,970,132 | 7/1976 | Giannone | 152/233 |

FOREIGN PATENT DOCUMENTS 1505879 7/1970 Fed. Rep. of Germany ........... 152/241

Primary Examiner—F. J. Bartuska

[57] ABSTRACT

Chain links for anti-skid chains, integrating cross chain end attachment with side member sections is disclosed. Fastening devices attached to opposite ends of the inner side member and extended to the outer side member thereby forming an additional cross member is provided. Leader devices for the extension are also disclosed. Binder devices for the outer side member are disclosed. A flagging device for chain orientation is further disclosed.

10 Claims, 14 Drawing Figures

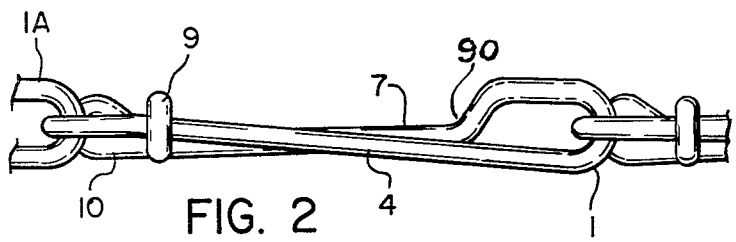
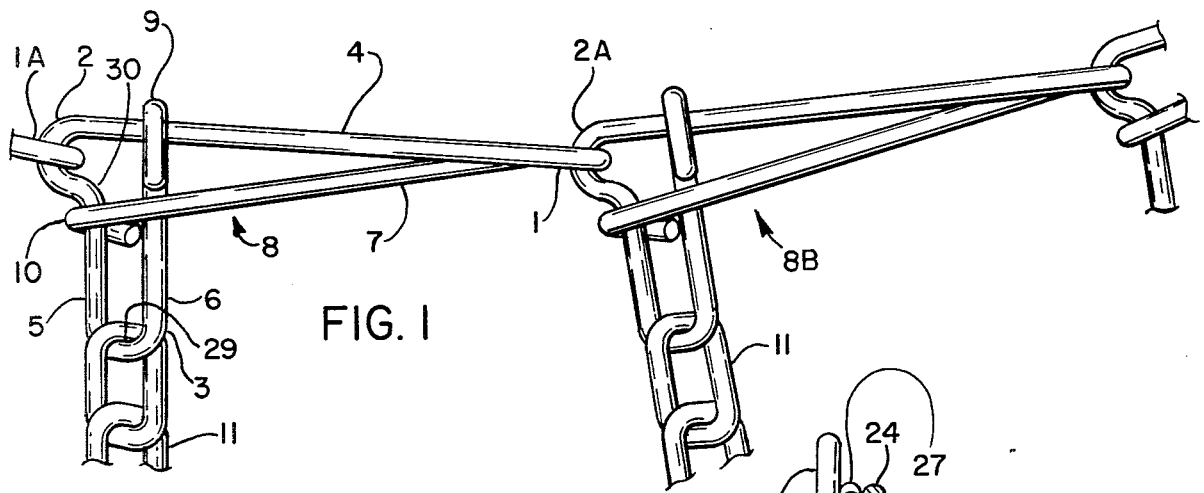
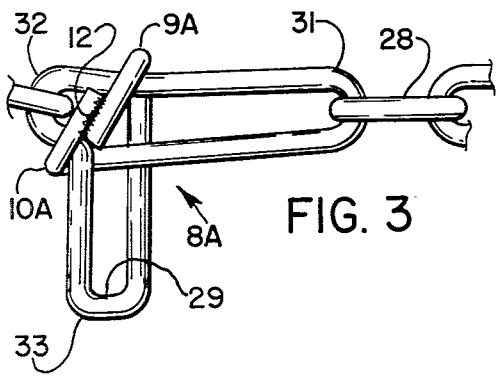
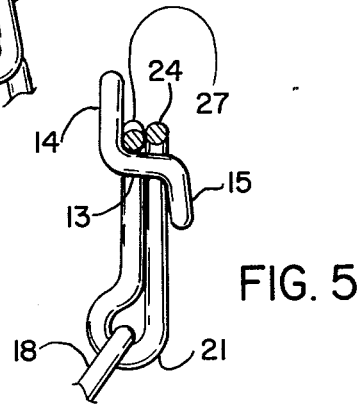
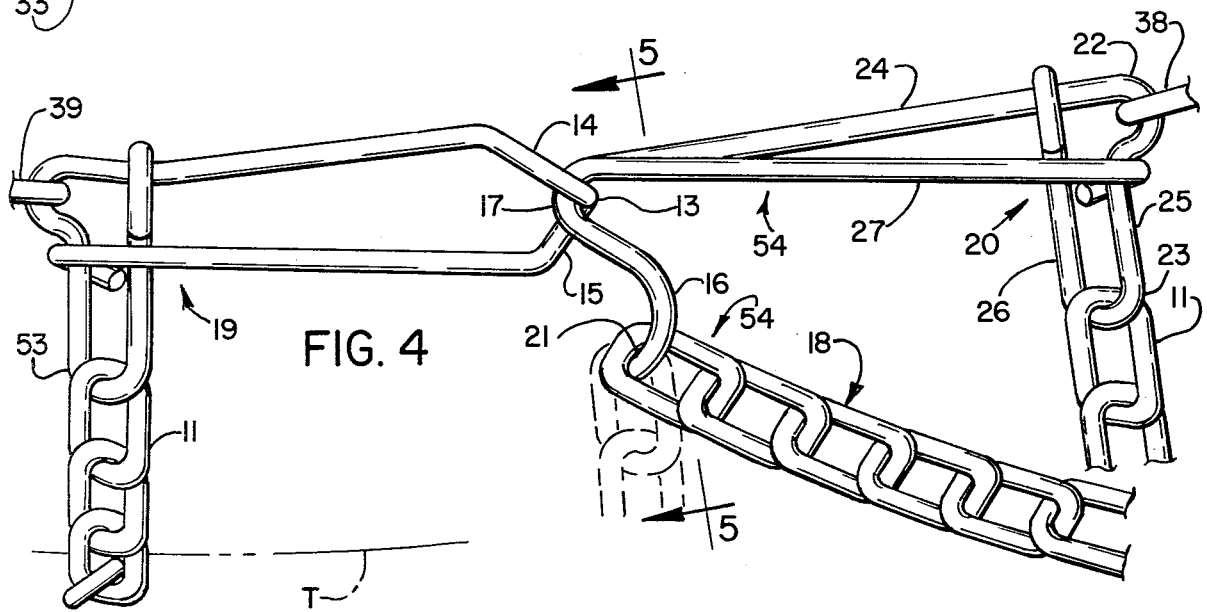

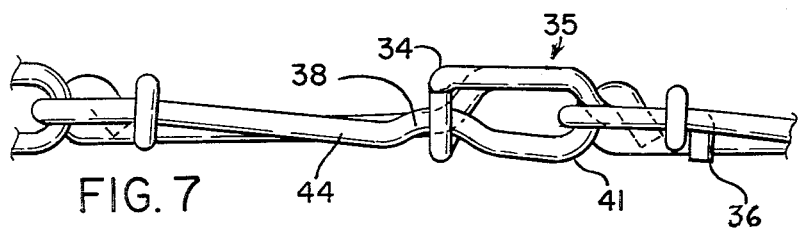
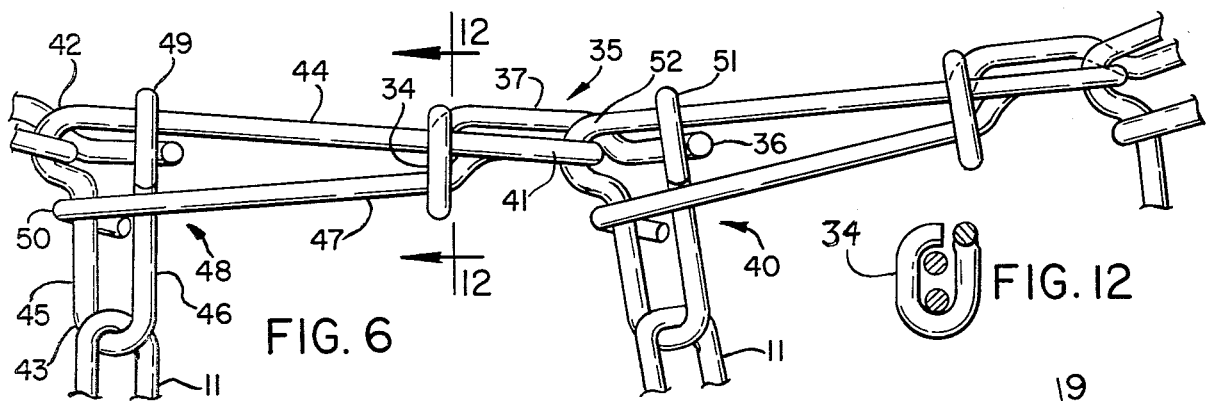
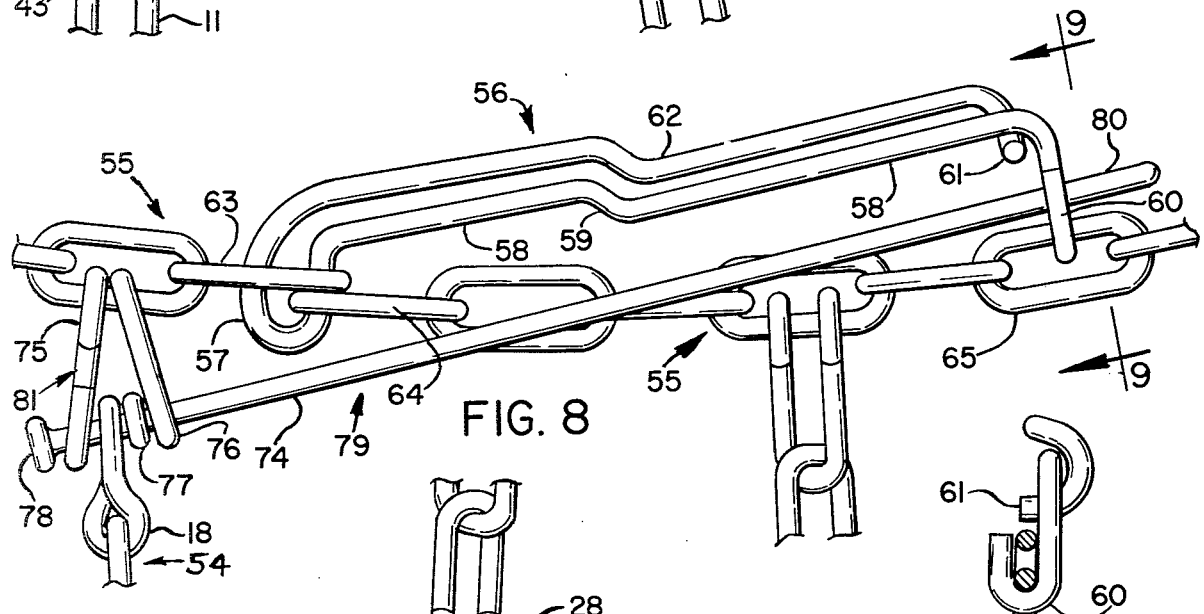
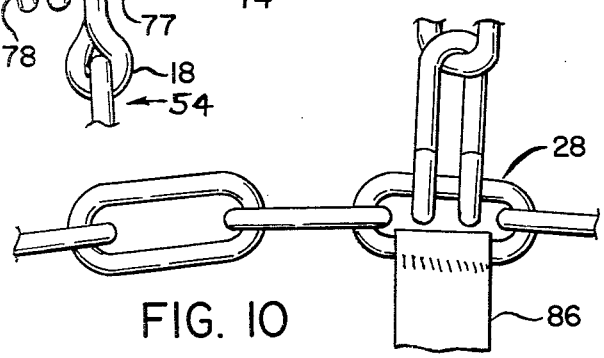
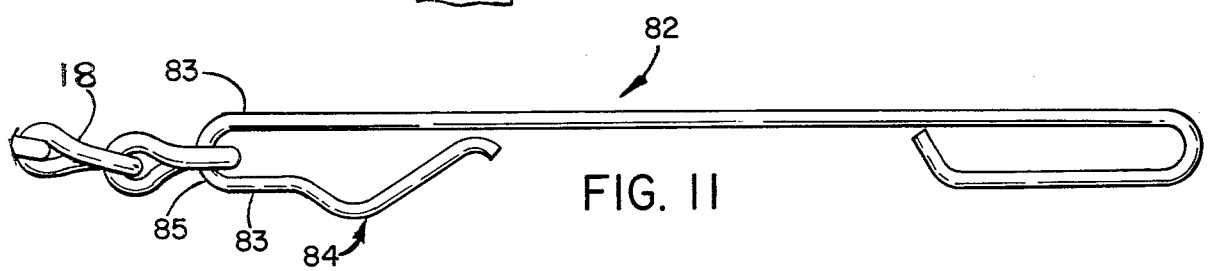

TIRE CHAIN LINKS AND FASTENING DEVICE

BACKGROUND OF THE INVENTION

This invention relates to anti-skid chains such as those used on automobiles, trucks and the like.

Tire chains most commonly used include an inner side chain, an outer side chain, and cross chains connected therebetween, one end of each side chain being provided with a hook suitable for connecting both ends of each side chain. When the chains are in position around the tire, the cross chains extend over the tread of the tire and provide a gripping surface which increases the traction of the tire in mud, snow, or ice.

Side chains are commonly welded straight link chains and cross chain end hooks are folded over one bar of the side chain link. This requires a highly technical welding process and quality control, and cross chain end hooks are subjected to abrasive wear because of the alternating drive forces against the end hooks, thus causing distortion of the end hooks under strain. Accordingly, a need exists for a high strength weldless or minimally welded linkage to connect the side chain and cross chain.

In U.S. Pat. No. 1,617,627 to Frambach a side chain link integrating the cross chain attachment is disclosed in which two terminal ends of the bar forming the link, placed adjacently at one end, comprise the attachment to the adjoining side chain link. Because the attachment is subjected to inter-link motion and abrasion, the side chain end hooks of this invention become weakened thus allowing the end hooks to unwrap before optimum chain life is achieved. By the time service of the cross chain is normally needed, manipulation of the side chain end hook may accelerate failure, because the end hook tends to bend severely at the wear point as it is being opened. Frambach's link and U.S. Pat. No. 1,758,739 to Evans are alike difficult to serve the cross chains when needing replacement.

Also in Evans, the right angular force exerted by the cross member against the longitudinal side chain line adds forces to the terminal end wrap which would tend to unwrap at least one terminal end wrap no matter where the cross member loop is placed on the link.

The present invention further relates to tire chains which make the connection of the inner side member by using an extension on one end of the inner side member which completes the inner side member connection from a point remote from the actual point of connection, then further extends to the outer side member thereby forming an additional cross member. One embodiment of this type of inner connection is described in my patent application Ser. No. 662,432 filed Mar. 1, 1976.

U.S. Pat. No. 2,553,849 to Dines and Swiss Pat. No. 435,002 to Fullemann also show extension side chains which ultimately form an additional cross chain by various connection arrangements. Dines and Fullemann do not employ automatically engaged inner connection and the extension itself is easily attached in an undesireable twisted condition, hence a need exists for an improved connection means on the extension occupying only a narrow space width, and utilizing commonly used cross chain components.

SUMMARY OF THE INVENTION

The present invention is directed to a novel side chain link which integrates the function of side chain links with the cross chain end hook into one piece construction thereby reducing cost of manufacture, eliminating welds, and increasing strength.

Another object is to provide tire side chain link, which can be restricted in motion at the points of juncture so that the asembled chain can be lifted under a fender and over the tire.

A further object of the invention is to provide a tire side chian link integrating in one piece the cross chain attachment which link also functions as a ratchet means for the inner connection.

Another object is to provide a tire side chain link integrating in one piece the cross chain attachment which link also functions as a catch for the ratchet means at a single predetermined point thereby accomplishing the inner connection of the tire side chain remote from the point of connection and in confined space areas.

Another object is to provide improved binder means for tightening the outer side member together, the binder also being adapted when disengaged, to hold the ends of the outer side chain together to reduce tangling and simplify application.

Still another object is to provide leader means for the extension which is easily manufactured and utilized.

Another object is to provide a flagging means to orient the chain for the installer.

For a fuller understanding of the nature and objects of the invention, reference should be had to the following detailed description taken in connection with the accompanying drawings.

BRIEF DESCRIPTION OF THE DRAWINGS

FIG. 1 is a side elevation of the side member chain link;

FIG. 2 is a top view of FIG. 2;

FIG. 3 is a side elevation of an alternative link;

FIG. 4 is a side elevation of the inner side member extension link and cross member shown engaged in the ratchet loop;

FIG. 5 is a sectional view taken along line 5—5;

FIG. 6 is a side elevation of the chain link when fixed with motion limiting means;

FIG. 7 is a top view of FIG. 6;

FIG. 8 is a side elevation of preferred binder on the outer side member showing the leader of the extension secured to attachment means on the outer side member;

FIG. 9 is a section taken along line 9—9 of FIG. 8;

FIG. 10 is a side elevation of flagging means.

FIG. 11 is a view of alternative leader means showing the configuration which is also used for a lifting tool device.

FIG. 12 is a section taken along lines 12—12 of FIG. 6;

DESCRIPTION OF THE PREFERRED EMBODIMENT

Figure 14:
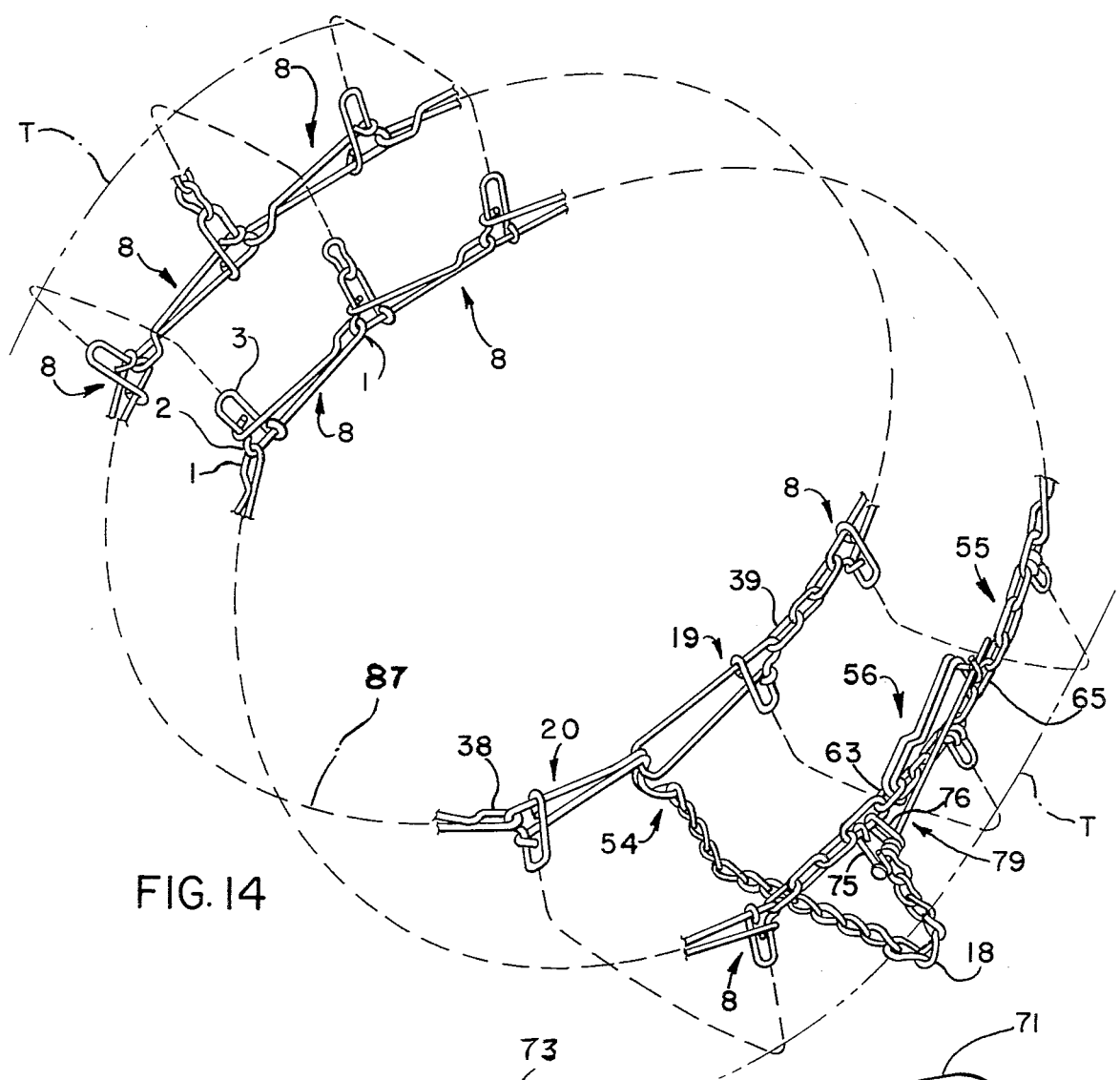
FIG. 14 is a partial perspective view of the assembled tire chain.

FIGS. 1 and 2 are views of one preferred embodiment of the present invention comprising a side chain link indicated generally at 8. A first attachment end 1, a second attachment end 2, and a third attachment end 3 are all substantially U-shaped. A longitudinal bar 4 connects the first attachment end 1 to the second attachment end 2 and an arm 5 connects the second attachment end 2 with the third attachment end 3. Continuing and extending from the third attachment end 3 is a first terminal bar 6 affixed to the longitudinal bar 4 by an end wrap 9. Continuing and extending from the first attachment end 1 is a second terminal bar 7 affixed to the arm 5 by an end wrap 10. Extending over and around the tire T is a cross member 11 attached to link 8 at the third attachment end 3. A like link 8B attaches to link 8 by attachment 2A joining and mutually enclosing the first attachment end 1. Similarly the second attachment end 2 joins an attachment end 1A. It will be understood that to service or replace the cross member 11 only one end wrap 9 must be partially unwrapped to allow removal or replacement of the cross member 11. To service the link 8B the end wrap 10 must be partially unwrapped and to service the attachment 1A both end wraps 9 and 10 must be partially unwrapped but these latter services are less frequently necessary.

Since the forces exerted from cross member 11 alternate during drive and braking of tire T, the cross member 11 shifts its point of exertion against the third attachment end 3, and because the third attachment end 3 is held rigidly in place by arm 5 and first terminal bar 6 the elongated area 29 of third attachment end 3 makes possible an increased wearing area 29. This is shown also in FIG. 3. Thus the comparitively soft attachment end 3 experiences more than one wear zone 29 from the cross member 11 which is commonly hardened for road wear.

It will be noted that the arm 5 makes a substantially direct and uninterrupted connection between the second attachment end 2 and the third attachment end 3 and the longitudinal bar 4 makes a substantially direct and uninterrupted connection between the first attachment end 1 and the second attachment end 2. Consequently, the tensile forces exerted between the first attachment end 1 and the second attachment end 2 do not substantially add forces to unwrap the end wrap 9 and the tensile forces exerted right angularly against the third attachment end 3 do not substantially add forces to unwrap the end wrap 10. Also the end wraps 9 and 10 are subject to almost no abrasive wear in their function.

In many applications, the first attachment end 1 is twisted approximately 90 degrees from the second attachment ends 2 and 3 and the twist area or protuberance 90 is used to limit the displacement of mutually enclosed attachment ends 1 and 2A when chain is loose.

In some applications it may be desireable to omit the second terminal bar 7. In this case the first attachment end is completed into a loop and the first terminal bar 6 may be positioned adjacently to bend 30 such that the second attachment end 2 is separated from the third attachment end 3 to prevent the adjacent attachment end 1A and the cross member 11 from being accidentally displaced from their points of connection. In FIG. 3 the end wraps 9A and 10A are shown terminated adjacently to each other so they may be affixed to each other as at 12. In this view the three attachment ends 31, 32, and 33 are substantially co-planar when the first attachment end 31 encloses a link 28. It will be noted that when the affixment means 12 such as a resistance weld is applied to the end wraps 9A and 10A only a moderate juncture would be required to maintain the link 8A in maximum strength condition. If the link 8A is subjected to intense forces until the link 8A is brought even to failure, the affixment 12 need not be equal in strength to the parent material due to the indirect nature of the force. Servicing of the cross member 11 is still possible, for a minimal affixment can be broken although such servicing is more difficult when ends are joined.

FIG. 6 and FIG. 7 show links indicated generally at 48 and 40 fitted with motion limiting means 35. A series of such links is especially useful when applied to the inner side member of a tire chain to hold the inner side member in an arcuate configuration semi-rigidly so the installer may lift the chain under a low or tight fender and over the tire. In the preferred embodiment a longitudinal bar 44 and a second terminal bar 47 are enclosed loosely with a loop 34. Continuing and extending from the loop 34 is a bar 37 disposed right angularly to the loop 34 and adjacent to the second terminal bar 47, then the bar 37 is further formed to extend into the second attachment end 52 of the adjacent link 40; then the bar 37 is extended further under the end wrap 51 and terminated in a right angular bend 36 adjacent to the end wrap 51. The bend 38 retains the loop 34 in longitudinal position in cooperation with the bend 36.

FIGS. 4 and 5 show a ratchet means 19 engaged with a link portion 20 of an extension 54, having a cross member 18 attached to a first attachment end 21. The extension link 20 and the cross member 18 comprise the extension 54 in this view and are used to engage the ratchet means 19 to draw the inner side member ends 38 and 39 together. In this description and in the appended claims the word ratchet is used to mean a feature which allows the passage of another feature over the feature in one direction, but which can arrest the passage of the same other feature when the other feature passes over the feature in a direction opposite the one direction.

In the preferred embodiment, the ratchet means 19 is similar to the link 8 of FIG. 1 except that the first attaching area 13, 14, and 15 is adapted to receive the catch 17 of extension link 20. As shown in FIG. 4 but taken as a plan view, the V-shape formed by the bar 14 and the bar 15 are joined by a downward bent ratchet bar 13 as referenced from bar 14 viewed in plan. The length of the downward bend must be sufficient to receive the longitudinal bar 24 and the second terminal 27. Because the cross member 11 is attached to the third attachment end 53 the opening formed by bar 14, ratchet bar 13, and bar 15 are held in an appropriate attitude for accepting the slide 16 and catch 17 of extension link 20 when extension 54 is being pulled over the downward bent ratchet bar 13. Similarly the extension link 20, being attached to the cross member 11 is held in an appropriate attitude for engagement of the catch 17 with the ratchet bar 13. When the first attachment end 21, the slide 16, and the catch 17 are arranged in an S-shaped configuration, a pull on the additional cross member 18 easily effects the juncture with the ratchet means 19. Because the end of the extension 54 attached to the inner side member 38 is a single link up to the catch 17, the need for a swivel means to straighten a possible twist in the extension is eliminated and the additional cross member 18 is more easily oriented for proper attachment to securing means on the outer side member 55.

When the extension 54 is adapted to receive the ratchet means 19 at a single predetermined catch point 17 it is desireable to loosen the outer side member 55 to allow latitude for that juncture, although since the inner connection 17 and 13 is made remotely with increased force, it is practical to leave the outer side member 55 connected in a loosened binder 56. FIG. 8 shows an embodiment of the binder 56 for that purpose. When the outer side member comprises links of chain the binder eye 57 encloses one end of the outer side member 64. The other end of the outer side member 63 is engaged by the lever bar 58. When the binder 56 is loosened, the link 63 slides along the lever bar 58 to the closure means 61, thereby greatly lengthening the outer side member. When the binder 56 is tightened, link 63 slides along lever bar 58 past the detent 59. Detent 59 serves as an opposition to accidental sliding of link 63 back on the lever bar 58. As the binder 56 is fully tightened, the hook 60 is engaged over one bar of the link 65 by deflecting the closure means 61. The anti-rotation bar 62 serves as an elastic means to return the closure means 61 to closed position and stop rotation of the binder 56, in the link 63, thereby rendering impossible a twist in the outer side member 55, due to binder rotation. Once the binder is engaged, the entire chain is fully tight except for the additional extension 18 which must be engaged to attachment means on the outer side member 55 after driving the vehicle ahead about one foot. Thus the chain can be installed under conditions where it is dangerous to move or jack the car until the chain is so tightened. The last foot required to move the car is therefore done safely.

Figure 13:
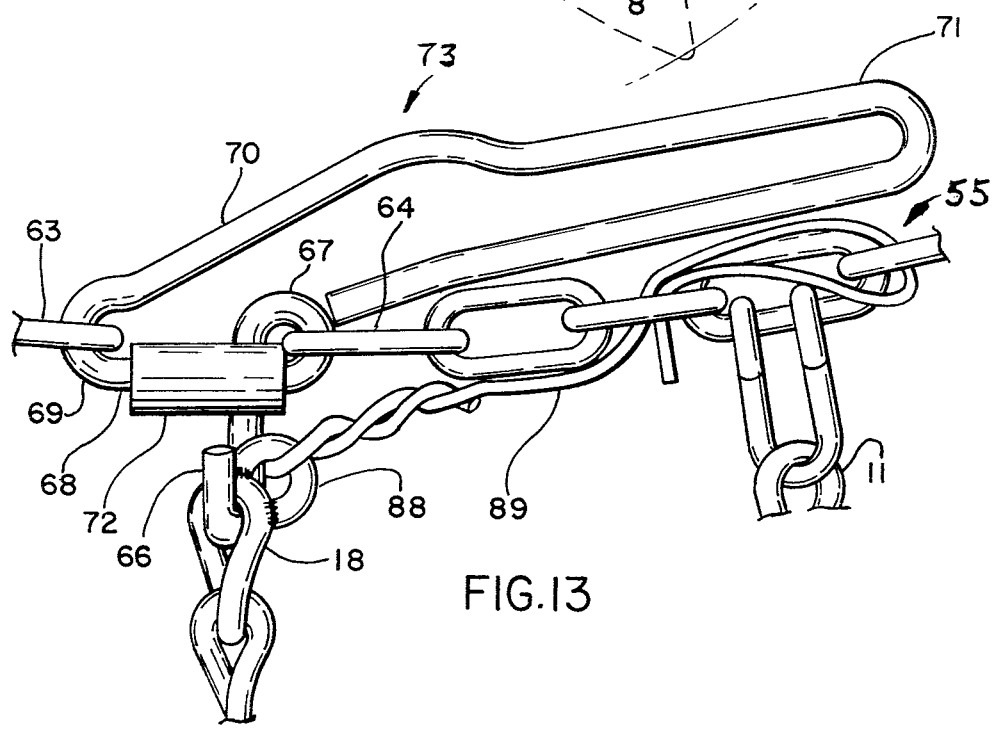
FIG. 13 is a side elevation of an alternative binder for the outer side member and an alternative leader means.

An alternative binder means 73 for the outer side member 55 is shown in FIG. 13 in which an attachment member comprising a hook 66 is integral with the binder 73 and the hook 66 is adapted to receive and secure the outer end of the additional cross member 18. When the binder 73 is disengaged, the link 63 slides along the overcenter slide 70 into the end of the elongated loop 71 thereby greatly increasing the length of the outer side member 55. Simultaneously the hook 66 is inverted allowing release of the additional cross member 18. During engagement the link 63 slides along the elongated loop 71 and past the overcenter slide 70 into the slide catch 69, thereby drawing links 64 and 63 to the tightened position. The binder 73 will retain its position without further latching because the overcenter slide 70 is positioned closer to the eye 67 than is the final slide catch 69. After tightening the binder 73 the installer causes the vehicle to move ahead or back about one foot so the additional cross member 18 can be attached to the hook 66. To attach the hook 66, the binder 73 is loosened again just sufficiently to engage the additional cross member 18 into the hook 66. Because the hook 66 is integral with the binder 73, manipulation of the connection is greatly enhanced. Then the binder 73 is returned to the engaged position thereby tightening the outer side member 55 and the additional cross member 18 simultaneoulsly. The connection bar 68 connects the eye 67 to the slide catch 69 and may be fitted with a closing means 72 comprising a resilient tube. The attachment of additional cross member 18 cannot be made over the hook 66 without elastically deforming the closing means 72.

In FIG. 8 a leader 79 is shown added to the additional cross member 18 for use as an aid to threading the extension 54 through the inner ratchet means 19. In the preferred embodiment after the inner ratchet 19 and catch 17 are engaged, the outer binder 56 is tightened and secured to the link 65. The vehicle is moved ahead or back about one foot so the additional cross member 18 can be attached to links 75 and 76 on the outer side member 55, by means of the leader 79. The leader bar 74 is inserted through the link 76 as far as possible, then the installer depresses the gripping end 80 of the leader 79 using it as a lever until leader bar 74 slides through link 76 until secondary head 77 is abutted against the link 76. The leader 79 is further manipulated until engaged within link 75 through slot 81. Gripping end 80 is then forced past closing means 61 into hook 60 for final disposal. Primary head 78 retains leader 79 on link 75.

It is important to note that leader bar 79 is free of hooks or enlargements beginning from its attachment end 77-78 until its extremity 80. This is a safety feature of the leader. Should an installer drive the vehicle with the outer attachment disengaged but with the inner ratchet and catch engaged, the dangling leader could catch on the vehicle axle members thereby to damage both chain and vehicle. Other leader means can be employed including means which is not itself part of the connection. In this case the additional cross member 18 may be attached directly into an attachment means such as the hook 75, although the leader may be used as a lever or pulling device to aid making the connection.

In FIG. 11 a leader 82 comprises a hook 85 which is adapted to engage the outer end of the additional cross member 18 and is used to facilitate engagement of the inner ratchet means 19 with the catch 17. After the vehicle is driven ahead or back about one foot the leader 82 is removed from the additional cross member 18 and attachment is effected to the attachment means on the outer side member such as link 75. The configuration of the hook 85 is such that the external portions thereof 83 are small enough to enter openings on the tire chain side member, but the protuberance 84 is large enough to limit the entrance of the hook 85 thereby making a leader which doubles as a lifting tool.

FIG. 13 shows still another alternative leader having an attachment 88 and a soft wire 89 laced in the outer side member 55 by hand manipulation.

In FIG. 10 a flagging means 86 is shown attached to a portion of the tire chain side member such as a link 28. The preferred embodiment is a flexible sheet 86 folded over one bar of the link 28 and attached to itself by affixing means such as chemical adhesives. When the flagging means 86 is located on the inner side member 87 substantially opposite the ratchet bar 13 and catch 17, the tire chain is very easily oriented to the installer for application. The flagging means 86 is attached to a member of the tire chain not normally experiencing contact with the road surface such as the link 28.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a chain link for a tire chain including a first attachment end and a second attachment end aligned, a third attachment end disposed right angularly to the aligned attachment ends, a longitudinal bar connecting the aligned attachment ends, an arm connecting the third attachment end with the second attachment end, the three attachment ends being substantially U-shaped, a first terminal bar, continuing and extending from the third attachment end to the longitudinal bar and affixed thereto by an end wrap, a second terminal bar, continuing and extending from the first attachment end to the arm and affixed thereto by an end wrap, the improvement comprising:

affixment means whereby the end wrap of the first terminal bar is affixed to the end wrap of the second terminal bar.

2. In a tire chain having an inner side member, an outer side member and cross members extending therebetween, the tire chain being adapted to be mouned on an automobile tire or the like with the cross members extending around and across the tread of the tire, and having an extension attached at one end of the extension at a point adjacent one end of the inner side member and a ratchet means attached at a point adjacent the other end of the inner side member, the ratchet means being adapted to receive the other end of the extension such that the ratchet means and the extension together form means for connecting together both ends of the inner side member, the improvement comprising:

an extension link comprising a first attacment end adapted to fasten the remainder of the extension, a catch adapted to engage the ratchet means, a second attachment end adapted to fasten the one end of the inner side member, the first attachment end and second attachment end being substantially U-shaped, a longitudinal bar connecting the catch and the second attachment end, a slide connecting the catch and the first attachment end, the point where the catch engages the ratchet means and the point of the second attachment end forming a line, the first attachment end being disposed right angularly to the line, and a third attachment end, substantially U-shaped, being disposed right angularly to the line and at substantially the same vector from the line as the first attachment end, the third attachment end being adaped to fasten a cross member; and an arm connecting the third attachment end to the second attachment end.

3. The improvement of claim 2 further comprising:
a first terminal bar continuing and extending from the third attachment end to the longitudinal bar such that the second attachment end and the third attachment end are enclosed.

4. The improvement of claim 3 further comprising:
a second terminal bar continuing and extending from the first attachment end configuratively with the slide and the catch, the second terminal bar continuing and extending from the catch to the arm.

5. The improvement of claim 4 further comprising affixment means, whereby the first terminal bar ia affixed to the longitudinal bar, and the second terminal bar is affixed to the arm.

6. The improvement of claim 5 wherein the affixment means comprises a wrap of the first terminal bar end around the longitudinal bar and a wrap of the second terminal bar around the arm.

7. The improvement of claim 6 wherein the end of the wrap of the first terminal bar and the end of the wrap of the second terminal bar are disposed adjacent to each other and affixed together.

8. In a tire chain having an inner side member, and outer side member and cross members extending therebetween the tire chain being adapted to be mounted on an automobile tire or the like with the cross members extending around and across the tread of the tire, having means for connecting the ends of the inner side chain together and a binder for connecting one end of the outer side member to the other end of the outer side member, the improved binder comprising;

an eye, adapted to engage the one end of the outer side member;

a slide catch adaped to engage the other end of the outer side member;

a connection bar connecting the eye to the slide catch;

an overcenter slide adapted to dispose the other end of the outer side member to the tightened position; and an elongated loop enclosing and retaining the other end of the outer side member when disengaged, the eye and the slide catch forming a line, the elongated loop being disposed parallelly to the line and the direction of elongation being substantially opposite the slide catch.

9. The improvement of claim 8 further comprising a hook adapted to receive the end of a cross member, the hook continuing and extending from the eye being disposed right angularly to the line adjacent to the connection bar.

10. The improvement of claim 9 further comprising; closing means comprising a resilient means fitted adjacent to the termination of the hook such that chain links cannot be engaged on the hook without elastically deforming the closing means.

* * * * *